US009961004B2

(12) United States Patent
Slater et al.

(10) Patent No.: US 9,961,004 B2
(45) Date of Patent: May 1, 2018

(54) POPULARITY-AWARE BITRATE ADAPTATION OF LINEAR PROGRAMMING FOR MOBILE COMMUNICATIONS

(71) Applicant: ViaSat, Inc., Carlsbad, CA (US)

(72) Inventors: Joshua G. Slater, Rancho Mission, CA (US); Joshua J. Righetti, Carlsbad, CA (US); Nirmalkumar Velayudhan, San Marcos, CA (US)

(73) Assignee: ViaSat, Inc., Carlsbad, CA (US)

( * ) Notice: Subject to any disclaimer, the term of this patent is extended or adjusted under 35 U.S.C. 154(b) by 285 days.

(21) Appl. No.: 14/874,158

(22) Filed: Oct. 2, 2015

(65) Prior Publication Data

US 2017/0099227 A1 Apr. 6, 2017

Related U.S. Application Data

(60) Provisional application No. 62/117,845, filed on Feb. 18, 2015.

(51) Int. Cl.
*H04L 12/851* (2013.01)
*H04L 12/815* (2013.01)
(Continued)

(52) U.S. Cl.
CPC ..... *H04L 47/2441* (2013.01); *H04B 7/18513* (2013.01); *H04L 47/22* (2013.01); *H04L 65/4084* (2013.01); *H04L 67/12* (2013.01)

(58) Field of Classification Search
None
See application file for complete search history.

(56) References Cited

U.S. PATENT DOCUMENTS 8,151,301 B2 4/2012 Bennett
8,291,462 B2 10/2012 Lee et al.
(Continued)

FOREIGN PATENT DOCUMENTS

EP 2071846 A1 6/2009

OTHER PUBLICATIONS

International Search Report and Written Opinion for Application No. PCT/US20161017763, dated May 31, 2016, 8 pages.
(Continued)

*Primary Examiner* — Chi H Pham
*Assistant Examiner* — Vladislav Agureyev
(74) *Attorney, Agent, or Firm* — Kilpatrick Townsend & Stockton LLP

(57) ABSTRACT

Embodiments provide popularity-based adaptive bitrate management of linear programming over constrained communications links. Embodiments can operate in context of a communications network communicating with multiple mobile client devices disposed in one or more transport craft. A number of channel offerings, including channels providing linear programming, can be made available via the communications network for consumption by the client devices. Embodiments can compute channel popularity scores for the channel offerings based on a predicted popularity, an estimated popularity, a measured popularity, etc. A bitrate can be determined for each (some or all) of the channel offerings based at least in part on its channel popularity score, so that more popular channel offerings can be communicated at higher bitrates. Determined-bitrate instances of the channel offerings can be obtained and/or generated, and delivered via the communications network, to the client devices for consumption.

26 Claims, 5 Drawing Sheets

(51) Int. Cl.
*H04L 29/08* (2006.01)
*H04B 7/185* (2006.01)
*H04L 29/06* (2006.01)

(56) References Cited

U.S. PATENT DOCUMENTS

| | | | |
|---|---|---|---|
| 8,316,082 B2 | 11/2012 | Igarashi | |
| 8,341,672 B2 | 12/2012 | Civanlar et al. | |
| 8,429,687 B2 | 4/2013 | Civanlar et al. | |
| 8,769,577 B2 | 7/2014 | Smoyer et al. | |
| 2006/0031564 A1* | 2/2006 | Brassil | H04L 29/06027 709/233 |
| 2008/0109558 A1 | 5/2008 | Lee | |
| 2008/0225167 A1 | 9/2008 | Beermann | |
| 2008/0307457 A1 | 12/2008 | Yang et al. | |
| 2009/0055540 A1 | 2/2009 | Foti et al. | |
| 2009/0083279 A1* | 3/2009 | Hasek | H04L 67/2823 |
| 2009/0254657 A1* | 10/2009 | Melnyk | H04L 47/10 709/224 |
| 2010/0138864 A1 | 6/2010 | Yoakum | |
| 2010/0158109 A1 | 6/2010 | Dahlby et al. | |
| 2010/0177642 A1* | 7/2010 | Sebastian | H04L 12/1859 370/248 |
| 2010/0315949 A1* | 12/2010 | Agarwal | H04B 7/18515 370/235 |
| 2011/0167447 A1 | 7/2011 | Wong | |
| 2012/0009890 A1* | 1/2012 | Curcio | H04L 29/06 455/230 |
| 2013/0326024 A1* | 12/2013 | Chen | H04L 65/4084 709/219 |
| 2013/0343194 A1* | 12/2013 | Agarwal | H04W 28/10 370/235 |
| 2014/0337887 A1 | 11/2014 | Kim | |
| 2014/0351383 A1 | 11/2014 | Wan et al. | |
| 2015/0032899 A1* | 1/2015 | Willars | H04L 65/4076 709/231 |
| 2015/0106472 A1* | 4/2015 | Viveganandhan | H04L 65/601 709/217 |
| 2015/0127845 A1* | 5/2015 | Phillips | H04L 65/601 709/231 |
| 2015/0163848 A1* | 6/2015 | Lin | H04W 76/046 370/329 |
| 2015/0172352 A1* | 6/2015 | Gopalakrishnan | H04L 65/608 709/219 |
| 2016/0127440 A1* | 5/2016 | Gordon | H04N 21/23439 709/219 |
| 2016/0261658 A1* | 9/2016 | Taylor | H04L 65/4076 |

OTHER PUBLICATIONS

Suman Kalyan Mandal and Michael Mburu; Intelligent Pre-fetching to Reduce Channel Switching Delay in IPTV Systems, 6 pages.
Ulf Jennehag, Bandwidth Efficient IPTV Distribution—On Error Resilience and Fast Channel Change, Mittuniversitetet, MID Swedwn University, Doctoral Thesis No. 39, Sundsvall, Sweden 2007, 127 Pages.

* cited by examiner

POPULARITY-AWARE BITRATE ADAPTATION OF LINEAR PROGRAMMING FOR MOBILE COMMUNICATIONS

CROSS-REFERENCE TO RELATED APPLICATIONS

This application is a non-provisional of, and claims priority to, U.S. Provisional Patent Application No. 62/117,845, titled, "Efficient IPTV Transmission Over Satellite With Watched Channel Feed Back and Low Rate Channel Preview," filed Feb. 18, 2015, which is incorporated herein by reference in its entirety.

FIELD

Embodiments relate generally to communications systems, and, more particularly, to providing popularity-based adaptive bitrate management of linear programming over constrained communications links.

BACKGROUND

As usage of the Internet evolves, there has tended to be an increasing prevalence of high-data rate applications, such as streaming video. The ability of communications service providers to serve consumers with data-intensive content can be limited by variations in capacity and demand across the communications infrastructure. For example, at different times of day, communications service providers can seek to maintain a quality of service to their users via constrained network links, while contending with changes in amounts and types of content being requested, link qualities and capacities, numbers and locations of mobile devices in the network, etc. As more users desire to consume media while in transit (e.g., on mobile devices, like mobile phones, laptop computers, tablet computers, integrated media terminals, or other in-transport terminals; and/or in context of a car, airplane, bus, cruise ship, or other transport craft), it can be desirable to improve the media consumption experience for those users. For example, it can be desirable to maintain a high quality of media delivery to a large number of mobile devices via a constrained communications network.

BRIEF SUMMARY

Among other things, systems and methods are described for providing popularity-based adaptive bitrate management of linear programming over constrained communications links. Embodiments can operate in context of a communications network communicating with multiple mobile client devices disposed in one or more transport craft (e.g., aircraft, etc.). A number of channel offerings, including channels providing linear programming, can be made available via the communications network for consumption by the client devices. Embodiments can compute channel popularity scores for the channel offerings based on a predicted popularity, an estimated popularity, a measured popularity, etc. A bitrate can be determined for each (some or all) of the channel offerings based at least in part on its channel popularity score, so that more popular channel offerings can be communicated at higher bitrates. Determined-bitrate instances of the channel offerings can be obtained and/or generated, and delivered via the communications network, to the client devices for consumption.

BRIEF DESCRIPTION OF THE DRAWINGS

The present disclosure is described in conjunction with the appended figures.

In the appended figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth to provide a thorough understanding of the present invention. However, one having ordinary skill in the art should recognize that the invention can be practiced without these specific details. In some instances, circuits, structures, and techniques have not been shown in detail to avoid obscuring the present invention.

Figure 1:
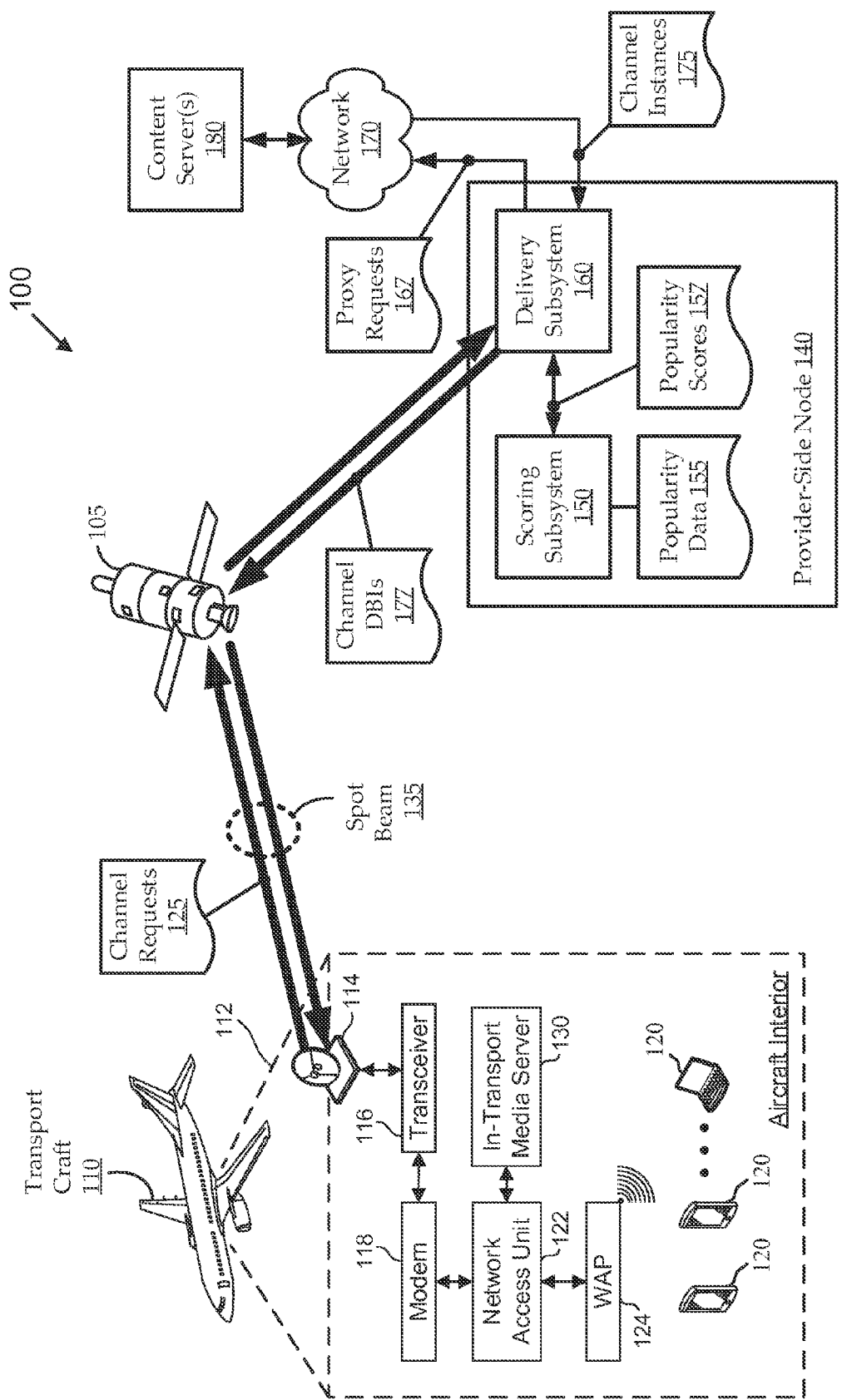
FIG. 1 shows a simplified diagram of a satellite communications system 100, which provides a context for various embodiments.

FIG. 1 shows a simplified diagram of a satellite communications system 100, which provides a context for various embodiments. Many other configurations are possible having more or fewer components than the satellite communications system 100 of FIG. 1. In the illustrated embodiment, the satellite communications system 100 includes a transport craft 110 in communication with one or more content servers NO via a satellite 105, a provider-side node 140 (e.g., a gateway, core node, etc.), and a network 170. While the communications system 100 is illustrated with the transport craft 110 as a single aircraft in communication with a satellite 105 via a spot beam 135, such illustration is not intended to be limiting, and embodiments can operate in many different contexts. For example, the communications system 100 can include one or more transport craft(s) 110 (e.g., airplanes, trains, buses, cruise ships, etc.) communicating via any one or more suitable communications architecture(s), including any suitable communications links, such as satellite communications systems, air-to-ground communication systems, hybrid satellite and air-to-ground communications systems, cellular communications systems, etc. Typically, because of the mobile nature of the transport craft 110, the communications architecture will likely involve at least one wireless communications link. In some embodiments, the transport craft(s) 110 can communication with communications systems having multiple carriers. The term "carrier" is used generally to include a wireless communications link by which one or more transport craft 110 and/or client devices 120 can be serviced, such as a spot beam 135 of a satellite communications system (e.g., servicing a particular spot beam coverage area), a particular carrier frequency band and/or polarization within a spot beam of a satellite communications system (e.g., servicing some or all terminals in a particular spot beam coverage area), a cellular carrier frequency band (e.g., servicing cellular terminals in a particular cell coverage area), etc.

The transport craft 110 can include a two-way communication system 112 to facilitate bidirectional communication with the satellite 105. In the illustrated embodiment, the two-way communication system includes an antenna system 114, transceiver 116, modem 118, network access unit 122, wireless access point (WAP) 124, and in-transport media server 130. The two-way communication system 112 can provide for reception of a forward downlink signal from the satellite 105 and transmission of a return uplink signal to the satellite 105 to support two-way data communications between client devices 120 within the transport craft 110 and the content server(s) 180. The client devices 120 can include mobile devices (e.g., smartphones, laptops, tablets, netbooks, and the like), such as personal electronic devices (PEDs) brought onto the transport craft 110 by passengers. As further examples, the client devices 120 can include passenger seat back systems or other devices on the transport craft 110. While the transport craft 110 is shown as an aircraft, the transport craft 110 can alternatively be a train, bus, cruise ship, or any other suitable transport environment having passengers consuming media thereon. Further, novel techniques described herein can be applied to other types of client devices 120, such as any suitable types of mobile devices, whether or not the device is on or in context of a transport craft 110. The client devices 120 can communicate with the network access unit 122 via a communication link that can be wired and/or wireless. The communication link can be, for example, part of a local area network such as a wireless local area network (WLAN) supported by WAP 124. One or more WAPs 124 can be distributed about the transport craft 110, and can, in conjunction with network access unit 122, provide traffic switching and routing functionality; for example, as part of a WLAN extended service set (ESS), etc.

In operation, the network access unit 122 can provide uplink data received from the in-transport media clients 120 to the modem 118 to generate modulated uplink data (e.g., a transmit intermediate frequency (IF) signal) for delivery to the transceiver 116. The transceiver 116 can upconvert and then amplify the modulated uplink data to generate the return uplink signal for transmission to the satellite 105 via the antenna system 114. Similarly, the transceiver 116 can receive the forward downlink signal from the satellite 105 via the antenna system 114. The transceiver 116 can amplify and downconvert the forward downlink signal to generate modulated downlink data (e.g., a receive IF signal) for demodulation by the modem 118. The demodulated downlink data from the modem 118 can be provided to the network access unit 122 for routing to the in-transport media clients 120. The modem 118 can be integrated with the network access unit 122, or can be a separate component in some examples.

As described in more detail below, the in-transport media server 130 can provide commands to the network access unit 122 to manage and distribute media channel offerings from the content server(s) 180 and/or the provider-side node 140 to the client devices 120 using the techniques described herein. The in-transport media server 130 can provide for on-board media distribution and can include one or more media servers, media storage devices, etc. The functions of the in-transport media server 130 can be implemented in hardware, instructions embodied in memory and formatted to be executed by one or more general or application-specific processors, firmware, or any combination thereof. In the illustrated embodiment, the in-transport media server 130 is shown as a separate device. Alternatively, some or all of the components or features of the in-transport media server 130 can be implemented within one or more other components of the two-way communication system 112. The network access unit 122 can also allow the client devices 120 to access one or more additional servers (not shown) local to the transport craft 110, such as a server storing media channels that provide in-flight entertainment.

As illustrated and as described more fully below, determined-bitrate instances (DBIs) 177 of channels can be received by the transport craft 110 (e.g., in response to channel requests 125 from the in-transport media server 130 and/or client devices 120) from the provider-side node 140 (and/or other ground terminals or other network nodes) via the satellite 105. The channel DBIs 177 can correspond to channel offerings made available by the provider-side node 140 from channel instances 175 received by the provider-side node 140 from content server(s) 180. The content server(s) can be part of the provider-side node 140, part of another provider-side node, and/or in communication with components of the provider-side node 140 via, network 170. The network 170 can be any type of network and can include for example, the Internet, an IP network, an intranet, a wide area network (WAN), a local area network (LAN), a virtual private network (VPN), a virtual LAN (VLAN), a fiber optic network, a cable network, a public switched telephone network (PSTN), a public switched data network (PSDN), a public land mobile network and/or any other type of network supporting communication as described herein. The network 170 can include both wired and wireless connections as well as optical links. At least some of the channel offerings (and, accordingly, the corresponding channel instances 175, channel DBIs 177, etc.) include linear programming (e.g., linear-programmed broadcasts of television, movie, radio, and/or other media). As used herein, "linear programming" generally refers to any stream of content that is scheduled for delivery at a certain time (e.g. a television show run at a set time, live event, etc.). For example, by selecting a "channel," a user effectively elects to consume whatever scheduled media is playing on that channel at that time as opposed to directly selecting the media content itself. In some implementations, one or more channel offerings can be used to support other types of programming, such as on-demand audio and/or video, etc.

The transport craft 110 and/or client devices 120 access communications services via carriers (e.g., satellite links and/or other communications links, etc.), and those carriers can be constrained. The communications links inherently have limited bandwidth resources, and those resources may or may not be sufficient to meet demands of all the terminals using those resources (e.g., including client devices 120), depending, for example, on the number of terminals being serviced, the amount of demand from those terminals, link condition (e.g., which can change due to weather, gateway outages, etc.), etc. The carriers can also be artificially constrained by communications service providers, for example, by provisioning, policy, etc. In general, the communications system 100 can always be considered constrained due to inherent limits on the bandwidth resources of its carriers, or the communications system 100 can be considered constrained based on measurement of carriers, provisioning schedules, statistical trends, and/or in any other suitable manner. For example, a constrained carrier can be one for which a committed amount of data to be communicated via the carrier over a predetermined period of time (i.e., "demand") is greater than or equal to the amount of data the carrier is capable of communicating over that predetermined period of time (i.e., "supply"), or some offset thereof (e.g., when the demand reaches 85% of the supply) for a particular carrier, a particular timeframe, a particular type of terminal, etc.

Embodiments can seek to maintain a high level of consumer satisfaction even in context of a constrained communications system. In particular, embodiments provide techniques for adapting bitrate of linear programming being received by client devices 120 in accordance with popularity (e.g., measured, predicted, etc.) of the linear programming content. For example, more popular content can be communicated to consumers at a higher bitrate, and less popular content can be communicated to consumers at a lower bitrate. In a broadcast, multicast, point-to-multipoint or similar communications system (e.g., the satellite communications system 100 illustrated in FIG. 1, a cellular communications system, etc.), and/or when communications are received by a node (e.g., the in-transport media server 130) and forwarded to multiple client devices 120, communicating a channel offering can use substantially the same amount of carrier bandwidth, whether the channel offering is received and consumed by one client device 120 or by many client devices 120. This can be considered as a conversion (or compression) benefit. For the sake of illustration, of fifty client devices 120 in a transport craft 110, thirty are consuming a first channel offering, fifteen are consuming a second channel offering, and five are consuming a third channel offering. Without adapting the bitrate to channel popularity, a common, mid-level bitrate can be used for communication of all three channels. For example, transmitting all three channels at 3 Megabits per second (Mbps) can result in the fifty client devices 120 consuming an average of up to 3 Mbps, which can be considered as a total consumption of up to 150 Mbps using only 9 Mbps of total channel resources (e.g., multicasting the three channel offerings at 3 Mbps each, or sending a 3 Mbps instance of each of the three channel offerings to the in-transport media server 130 for forwarding to the fifty client devices 120). Instead, the bitrates can be adapted to channel popularity, so that the three channels can be transmitted at 4 Mbps, 3 Mbps, and 2 Mbps, respectively. This can result in the fifty client devices 120 consuming an average of up to 4 Mbps (i.e., 5*30+3*15+1*5=200 Mbps total; 200/50=4 Mbps average), providing an effective 200 Mbps of streaming media with the same 9 Mbps (i.e., 5+3+1) of total channel resources. In the above example, adapting the bitrate to channel popularity resulted in more consumers receiving higher bitrate content and in more efficient use of the communications link. For example, no adaptation yielded a ratio of 150 Mbps of total consumption to 9 Mbps of used transmission resources, which can be considered a conversion benefit of 16.7; while popularity-based adaptation yielded a ratio of 200 Mbps of total consumption to 9 Mbps of used transmission resources, which can be considered a conversion benefit of 22.2. If overall consumer satisfaction is measured in terms of average consumption bitrate across client devices 120, and if communication efficiency is measured in terms of a ratio between total consumption bitrate and total transmission bitrate, the novel popularity-aware bitrate adaptation approaches described herein can tend to improve one or both of consumer satisfaction and communication efficiency.

Embodiments include a scoring subsystem 150 and a delivery subsystem 160. As described in more detail herein, the scoring subsystem 150 can compute channel popularity scores 157 for channel offerings, including at least channel offerings that are being requested (channel requests 125) by the client devices 120 and are being sourced the content server(s) 180). The delivery subsystem 160 can determine a bitrate for those channel offerings based at least in part on their respective computed channel popularity scores 157, and can obtain (e.g., receive, generate, etc.) and deliver instances of the channel offerings a those determined bitrates (channel DBIs 177) to the transport crafts 110 and the client devices 120. As described herein, the delivery subsystem 160 and the scoring subsystem 150 can be implemented as one or more computational platforms in the provider-side node 140 (e.g., as described with reference to FIGS. 1 and 3), as one or more computational platforms in one or more transport crafts (e.g., as described with reference to FIG. 4 below), as a combination of provider-side computational platforms and transport craft-side computational platforms, and/or, in any other suitable manner.

Embodiments of the scoring subsystem 150 can compute channel popularity scores 157 for multiple channel offerings according to channel popularity data 155. Some channel popularity data 155 can relate to predicted or estimated popularity of a channel offering, for example, based on popularity trends for the channel offering or related channel offerings; promotional value of the channel offering; estimated popularity of particular media included in the channel offering; content type; market ratings; transport craft 110 point of origin, transport path, etc.; time of day; etc. Other channel popularity data 155 can relate to past and/or present channel requests 125 by the client devices 120. For example, a present measure of channel popularity (e.g., an instantaneous channel popularity score 157) can be based on an aggregate number of requests for a particular channel offering by the client devices 120 at a particular instant in time. The aggregation of requests can be per transport craft 110 (e.g., all client devices 120 behind a particular in-transport media server 130, all client devices 120 in a particular transport craft 110, etc.), per carrier (e.g., all client devices 120 serviced by a particular spot beam 135), per subscriber group (e.g., all client devices 120 having particular shared preferences, similar device types, and/or any other suitable grouping characteristics), etc. As one example, suppose thirty passengers on an airplane are watching a sports game on a particular channel, the game ends, and the number of viewers of that channel drops to three. In response to the drop in viewership, embodiments can switch from sending the channel offering at a high bitrate to sending the channel offering at a low bitrate. As another example, suppose two airplanes are in a same carrier; and 27 passengers on the first airplane and three passengers on the second airplane are watching the sports game. At some point, the first airplane leaves the carrier (e.g., begins being serviced by a different carrier, leaving only the three passengers from the second airplane watching the game in the carrier. Again, there is a drop in viewership within the carrier, and embodiments can switch from sending the channel offering at a high bitrate to sending the channel offering at a low bitrate, accordingly. Such request-based channel popularity scores 157 can be used by the scoring subsystem 150 to generate a present channel popularity score 157 (e.g., what is the popularity of a particular channel offering at the present moment), as part of a trend analysis (e.g., is a particular channel offering apparently becoming more or less popular, how does present popularity of a channel offering compare to popularity of the same or other channel offerings at other comparable times, etc.), etc.

Embodiments of the delivery subsystem 160 can determine a bitrate (e.g., an optimized bitrate) for each (e.g., some or all) channel offerings according to the respective channel popularity score 157 determinations of the scoring subsystem 150. For example, each channel offering can be available from one or more content sources 180 at two or more bitrates, and/or the delivery subsystem 160 can adapt the bitrate of the channel offering to two or more bitrates, and the delivery subsystem 160 can select an appropriate bitrate (from the two or more available or generable bitrates) for each channel offering based on its channel popularity score 157. Such implementations can select an appropriate bitrate in any suitable manner. Though these and other embodiments are described with reference to bitrate, similar or identical techniques can be used to provide other (e.g., additional or alternative) types of popularity-based adaptations. For example, some progressive encoding schemes include various layers for encoding video data (e.g., abuse layer and one or more enhancement layers), and the computed channel popularity scores 157 can be used to determine which layers to provide.

In some embodiments, computation (and/or application) of channel popularity scores 157 takes into account what total data rate is available for transmitting all the channel offerings based, for example, on how much the carrier is presently constrained. For example, the channel popularity scores 157 can be impacted by both channel demand (e.g., how much do consumers want the channel) and supply (e.g., how much capacity is available through which to provide the channels). In one implementation, available data rate can be divided up among the various channel offerings based on their channel popularity scores 157 (i.e., the channel popularity scores 157 do not directly account for available capacity, but the translation of those scores 157 into DBIs does account for capacity constraints).

Figure 2A:
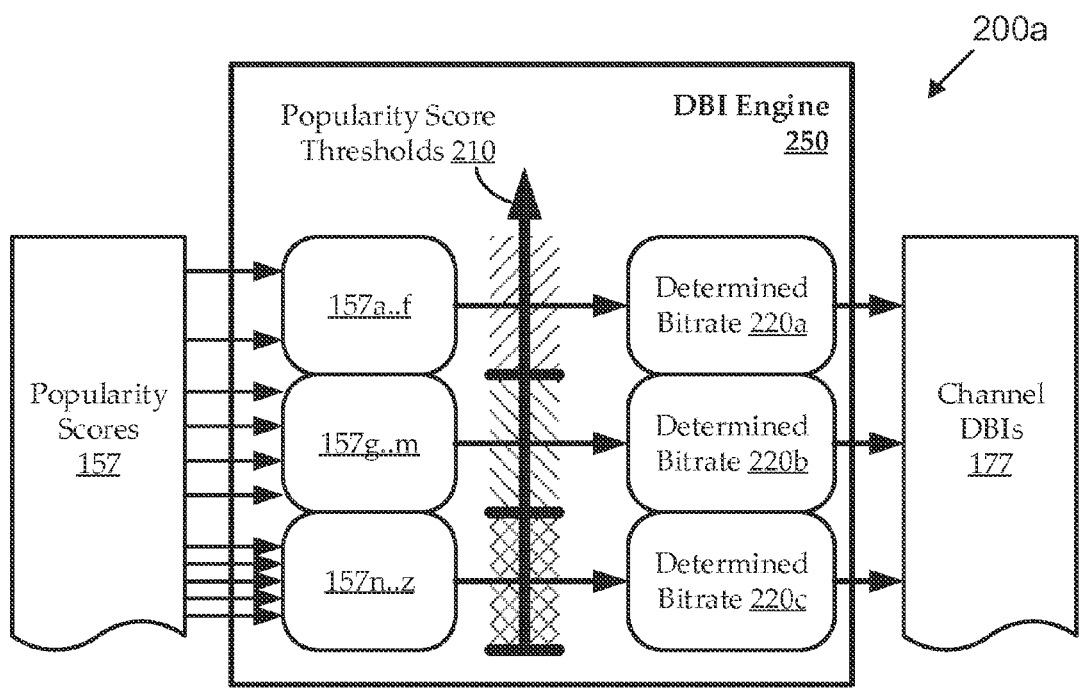
FIGS. 2A and 2B illustrate example techniques for determining bitrate by embodiments of the delivery subsystem according to channel popularity.
Figure 2B:
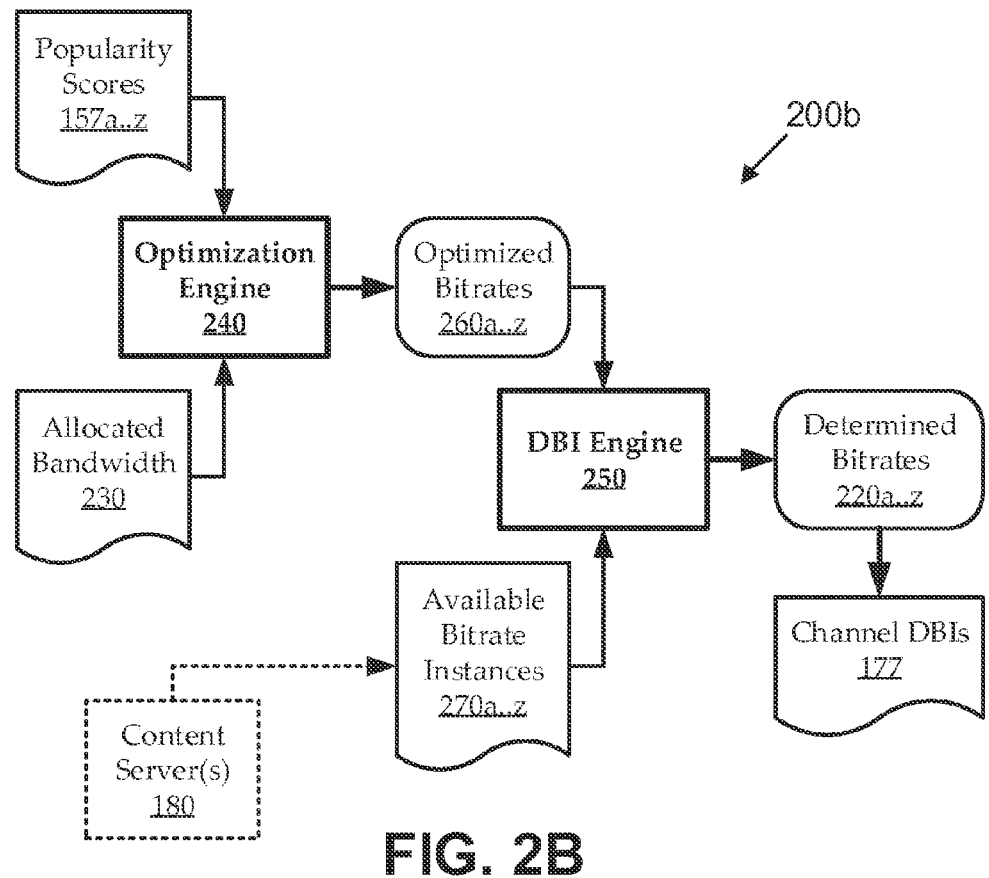

FIGS. 2A and 2B illustrate example techniques for determining (e.g., optimizing) bitrate by embodiments of the delivery subsystem 160 according to channel popularity. Turning first to FIG. 2A, techniques are illustrated by which embodiments of the delivery subsystem 160 can determine the bitrate for each channel offering, individually, according to its channel popularity score 157. As illustrated, embodiments of the delivery subsystem 160 can include a DBI engine 250. The DBI engine 250 can define two or more channel popularity score thresholds 210 (e.g., two are illustrated, but implementations can include any suitable number), and can select particular determined bitrates 220 for channel offerings having channel popularity scores 157 that exceed those respective thresholds 210. For example, as shown, channel offerings "a" ... "f" have channel popularity scores $157a \ldots f$, respectively, all of which exceed a higher channel popularity score threshold 210; channel offerings "g" ... "m" have channel popularity scores $157g \ldots m$, respectively, all of which exceed a lower channel popularity score threshold 210; and channel offerings "n" ... "z" have channel popularity scores $157n \ldots z$, respectively, all of which fall below the lower channel popularity score threshold 210. The DBI engine 250 can include associations between each channel popularity score threshold 210 and a determined bitrate 220, such that channel offerings "a" ... "f" are assigned a high determined bitrate 220a based on exceeding the higher channel popularity score threshold 210; channel offerings "g" ... "m" are assigned a medium determined bitrate 220b based on exceeding the lower channel popularity score threshold 210; and channel offerings "n" ... "z" are assigned a low determined bitrate 220c based on falling below the lower channel popularity score threshold 210. Embodiments of the delivery subsystem 160 can use the determined bitrates 220 to generate channel DBIs 177 for some or all of the channel offerings.

Other embodiments can implement the channel popularity score thresholds 210 in different ways. One such implementation ranks channel offerings by their channel popularity scores 157 and assigns particular bitrates by rankings; rather than the channel popularity score thresholds 210 representing threshold channel popularity scores 157, the channel popularity score thresholds 210 can represent groups of rankings. For example, the top twenty percent of channel offerings (ranked by channel popularity score 157) can be considered as exceeding the higher channel popularity score threshold 210, the middle thirty percent of channel offerings can be considered as exceeding the lower channel popularity score threshold 210, and the bottom fifty percent of channel offerings can be considered as falling below the lower channel popularity score threshold 210.

Turning to FIG. 2B, other implementations of the delivery subsystem 160 can determine the bitrates for groups of channel offerings based on an optimization schema. Some such implementations can allocate a predetermined amount of bandwidth for delivering the channel offerings and can seek to maximize consumer satisfaction (e.g., average bitrate per consumer) within the pre-allocated bandwidth. Other such implementations can dynamically allocate bandwidth according to present link conditions (e.g., accounting for present link availability, impact of present link quality on modcode point, demand on the communications links from other client devices 120 that may not be requesting any of the channel offerings and/or may not be on transport crafts 110, etc.) as part of maximizing consumer satisfaction. As illustrated, some embodiments of the delivery subsystem 160 can include an optimization engine 240 that can determine optimized bitrates $260a \ldots z$ for the channel offerings as a function of the channel popularity scores 157 and an allocated bandwidth 230 (e.g., and/or other communications resource allocation considerations). For example, implementations of the optimization engine 240 can compute a maximization function to maximize the consumed bitrate across all client devices 120, and/or to maximize an average consumed bandwidth across all client devices 120, according to the channel popularity scores 157 and within the allocated bandwidth 230. The result of such a maximization function can be the set of optimized bitrates $260a \ldots z$ for each channel offering. In some embodiments, the set of optimized bitrates $260a \ldots z$ can be used by the delivery subsystem 160 to generate the channel DBIs 177. In other embodiments, a DBI engine 250 of the delivery subsystem 160 can compare the set of optimized bitrates $260a \ldots z$ against a set of available bitrate instances $270a \ldots z$ for the channel offerings (e.g., available from the content servers) 180, generable by the delivery subsystem 160, etc.) to output determined bitrates $220a \ldots z$ for the channel offerings. For example, the DBI engine 250 can select and/or generate one or more determined bitrates 220 for each channel offering from the available bitrate instances $270a \ldots z$ to best fit the set of optimized bitrates $260a \ldots z$ (e.g., according to a fitting function). The delivery subsystem 160 can use those determined bitrates 220 to generate the channel DBIs 177 for some or all of the channel offerings.

Returning to FIG. 1, as described above, the bitrate for each channel offering can be determined in a manner that seeks to improve consumer satisfaction (e.g., according to an average consumed bitrate) and/or communication efficiency (e.g., according to a ratio of total consumed bitrate to total transmitted bitrate). Embodiments of the delivery subsystem 160 can use various approaches to obtain the channel DBIs 177, so the offerings can be delivered to the client devices 120 at those determined bitrates. In some embodiments, the delivery subsystem 160 can communicate proxy requests 167 to the content server(s) 180 for the channel offerings (e.g., for channel offerings invoked in channel requests 125, for all channel offerings, as needed, etc.). As used herein, "proxy request" is intended generally to indicate that the delivery subsystem 160 is making requests on behalf of one or more client devices 120, in-transport media servers 130, and/or other components; and is not intended to limit protocols, roles, architectures, etc. involving the delivery subsystem 160 or its requests. In response to the proxy requests 167, the delivery subsystem 160 can receive the requested channel offerings as channel instances 175 from the content server(s) 180 (e.g., via the network 170).

In some embodiments, the delivery subsystem 160 issues the proxy requests 167 as DBI requests. For example, the delivery subsystem 160 explicitly requests each channel offering from an appropriate content server 180 at the bitrate determined for that channel offering. Accordingly, the received channel instances 175 can include only those explicitly requested bitrate instances of each channel offering. For example, the received channel instances 175 can be the channel DBIs 177, or the delivery subsystem 160 can generate the channel DBIs 177 from the received channel instances 175 without any further bitrate adaptation (e.g., though the delivery subsystem 160 may still perform other functions to generate the channel DBIs 177, such as applying certain protocols, etc. in preparation for delivering the channel DBIs 177 to the transport craft(s) 110 and/or client devices 120).

In other embodiments, the delivery subsystem 160 issues the proxy requests 167 for multiple bitrate instances of each channel. For example, the delivery subsystem 160 requests two or more bitrate instances (explicitly or implicitly) for each channel offering from appropriate content server(s) 180, and the received channel instances 175 include those multiple bitrate instances. In some such embodiments, the delivery subsystem 160 can select one of the received channel instances 175 as corresponding to the respective determined bitrates and can generate the channel DBIs 177, accordingly. In other such embodiments, the delivery subsystem 160 can select one or more of the received channel instances 175 for each channel offering from which to adapt the bitrate to generate the respective channel DBIs 177.

In other embodiments, the delivery subsystem 160 issues the proxy requests 167 for high- (or highest available) bitrate instances of each channel from appropriate content server(s) 180, and the received channel instances 175 include those high-bitrate instances. The delivery subsystem 160 can generate the channel DBIs 177 by adapting the high-bitrate instances to respective determined bitrates. In some such embodiments, the delivery subsystem 160 adapts the bitrate to generate the channel DBI 177 only after determining that the determined bitrate is less than the received high bitrate (e.g., no adaptation is performed if the determined bitrate is greater than or equal to the received bitrate).

In the above and/or other embodiments, the delivery subsystem 160 can handle (e.g., impact, respond to, etc.) channel requests 125 in various ways. In some embodiments, the channel DBIs 177 are obtained, generated, delivered, etc. in response to explicit channel requests 125 for those channel offerings from client devices 120. For example, only requested channel offerings are scored by the scoring subsystem 150 and/or channel DBIs 177 are delivered only for requested channel offerings. Such handling of only explicit requests can be implemented with request-based popularity scoring, predictive popularity scoring, etc. In other embodiments, all (or a predetermined subset of) channel offerings are delivered (e.g., broadcast, multicast, etc.) at all times, regardless of whether there is any present consumption of that channel offering (e.g., any explicit request from any client device 120). For example, there is a minimum bitrate for transmission of those channel offerings. This can provide certain benefits, such as limiting delays experienced by client devices 120 when requesting an otherwise unrequested channel offering due, for example, to beginning transmission of the channel offering, allocating service flows, etc. In still other embodiments, the delivery subsystem 160 can impact channel offering requesting by publishing particular bitrates of channel offerings as available for request. For example, the delivery subsystem 160 can publish availability of only the channel DBIs 177, or availability of channel instances corresponding only to a subset of bitrates. In such embodiments, the client devices 120 and/or the in-transport media server 130 can issue channel requests 125 for those instances published by the delivery subsystem 160, and the requested instances can be delivered as the channel DBIs 177 in response to those requests.

Figure 3:
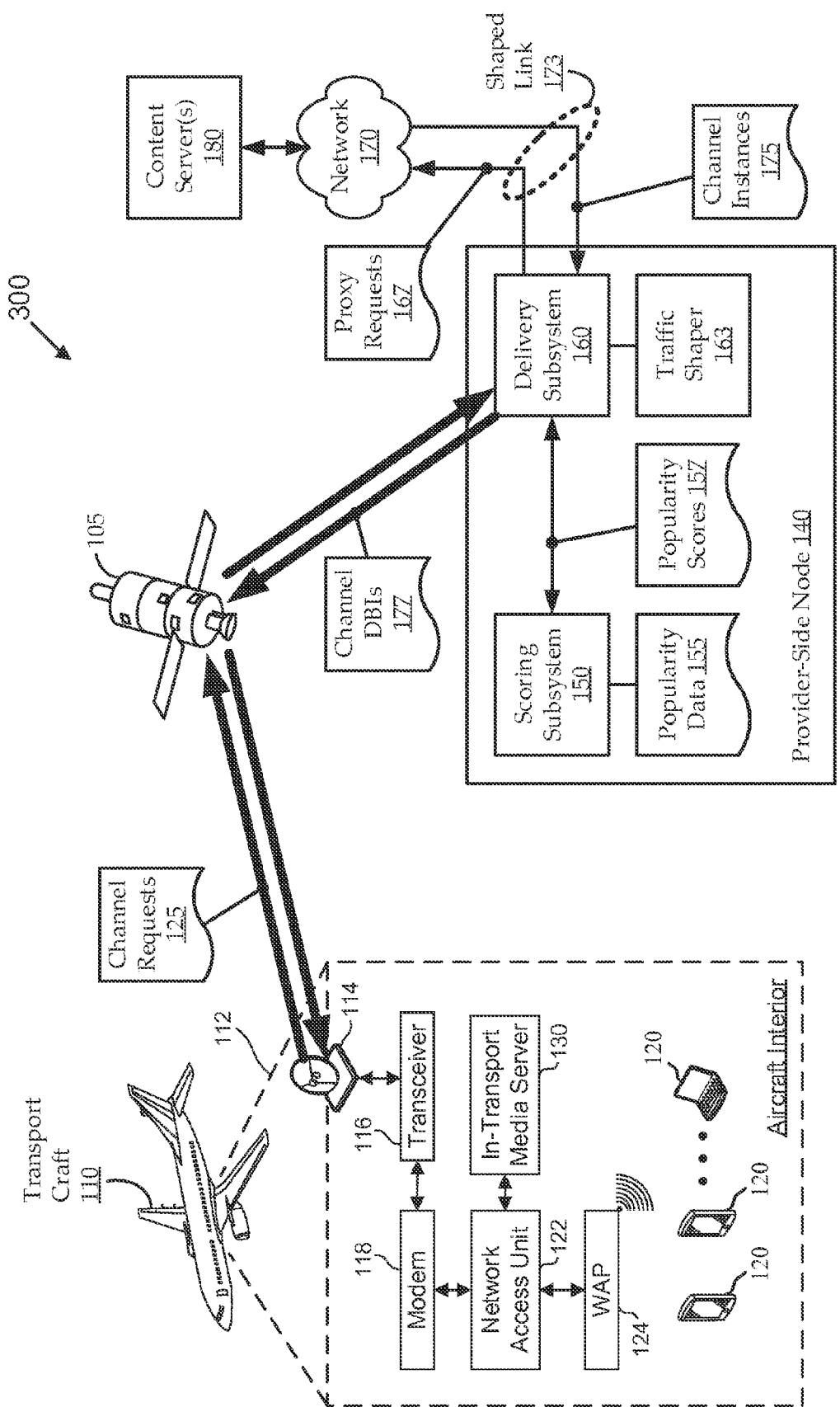
FIG. 3 shows a simplified diagram of another satellite communications system in which popularity-based bitrate adaptation is performed by provider-side traffic shaping, according to various embodiments.

FIG. 3 shows a simplified diagram of another satellite communications system 300 in which popularity-based bitrate adaptation is performed by provider-side traffic shaping, according to various embodiments. For the sake of added clarity, FIG. 3 is illustrated as similar to FIG. 1 using the same reference numerals, where appropriate. However, functionality described with reference to FIG. 4 can be implemented using alternative embodiments (e.g., other architectures, etc.). The satellite communications system 300 includes a transport craft 110 in communication with one or more content servers 180 via a satellite 105, a provider-side node 140, and a network 170. The transport craft 110 can include a two-way communication system 112 to facilitate bidirectional communication with the satellite 105, and the two-way communication system 112 can include an in-transport media server 130 to facilitate media distribution and/or other communications with client devices 120 (e.g., integrated with the transport craft 110, via on-board via wired connections, via an on-board WAP 124, etc.).

As described with reference to FIG. 1, channel DBIs 177 for multiple channel offerings can be received by the transport craft 110 (e.g., in response to channel requests 125 from the in-transport media server 130 and/or client devices 120) from the provider-side node 140 (and/or other ground terminals or other network nodes) via the satellite 105. The channel DBI(s) 177 for each channel offering can be obtained, generated, and/or delivered by a delivery subsystem 160 of the provider-side node 140 at respective bitrates determined according to respective channel popularity scores 157. The channel popularity scores 157 can be computed or otherwise determined by a scoring subsystem 150 of the provider-side node 140 based, for example, on predicted popularity, measured popularity, etc. The determination of bitrate for the channel DBIs 177 by the delivery subsystem 160 can be implemented in any suitable manner (e.g., as described above with reference to FIG. 2A or 2B). For example, the bitrate for each channel offering can be determined in a manner that seeks to improve consumer satisfaction (e.g., according to an average consumed bitrate) and/or communication efficiency (e.g., according to a ratio of total consumed bitrate to total transmitted bitrate).

As shown, embodiments of the delivery subsystem 160 can include, or be in communication with, a traffic shaper 163. As used herein, "traffic shaping" is intended to generally include any techniques for regulating communications data flow (e.g., packets, datagrams, etc.) across one or more links to impact quality of service (QoS) or other similar traffic profile or policy considerations (e.g., network performance, return on investment, etc.); and the traffic shaper 163 can be implemented as any device suitable for traffic shaping. Embodiments of the traffic shaper 163 can shape the communications link between the delivery subsystem 160 and the content server(s) 180 (e.g., one or more links, which may or may not include network 170), thereby forming a shaped link 173. For example, the shaped link 173 can be formed by impacting the timing and/or order of datagrams flowing through the link, by adjusting an amount of bandwidth allocated to the link, etc.

In some embodiments, one or more of the content servers 180 is configured automatically to adapt its media transmission to characteristics of the transmission links. For example, some streaming media servers, content distribution networks, and the like have adaptive bitrate (ABR) capabilities, whereby the bitrate of streaming content is automatically adapted to bandwidth of the link. Embodiments of the delivery subsystem 160 can formulate and communicate its proxy requests 167 for channel offerings over the shaped link 173 in such a way that the channel instances 175 are received from the content server(s) 180 at the determined bitrate (e.g., because of ABR at the content server(s) 180). For example, issuing the proxy requests 167 over the shaped link 173 can effectively force the content server(s) 180 to provide the channel instances 175 at the determined bitrate. The received channel instances 175 can be delivered over the communications network 300 as the channel DBIs 177 (e.g., or the delivery subsystem 160 can perform other functions to generate the channel DBIs 177, such as applying certain protocols, etc. in preparation for delivering the channel DBIs 177 to the transport craft(s) 110 and/or client devices 120).

Figure 4:
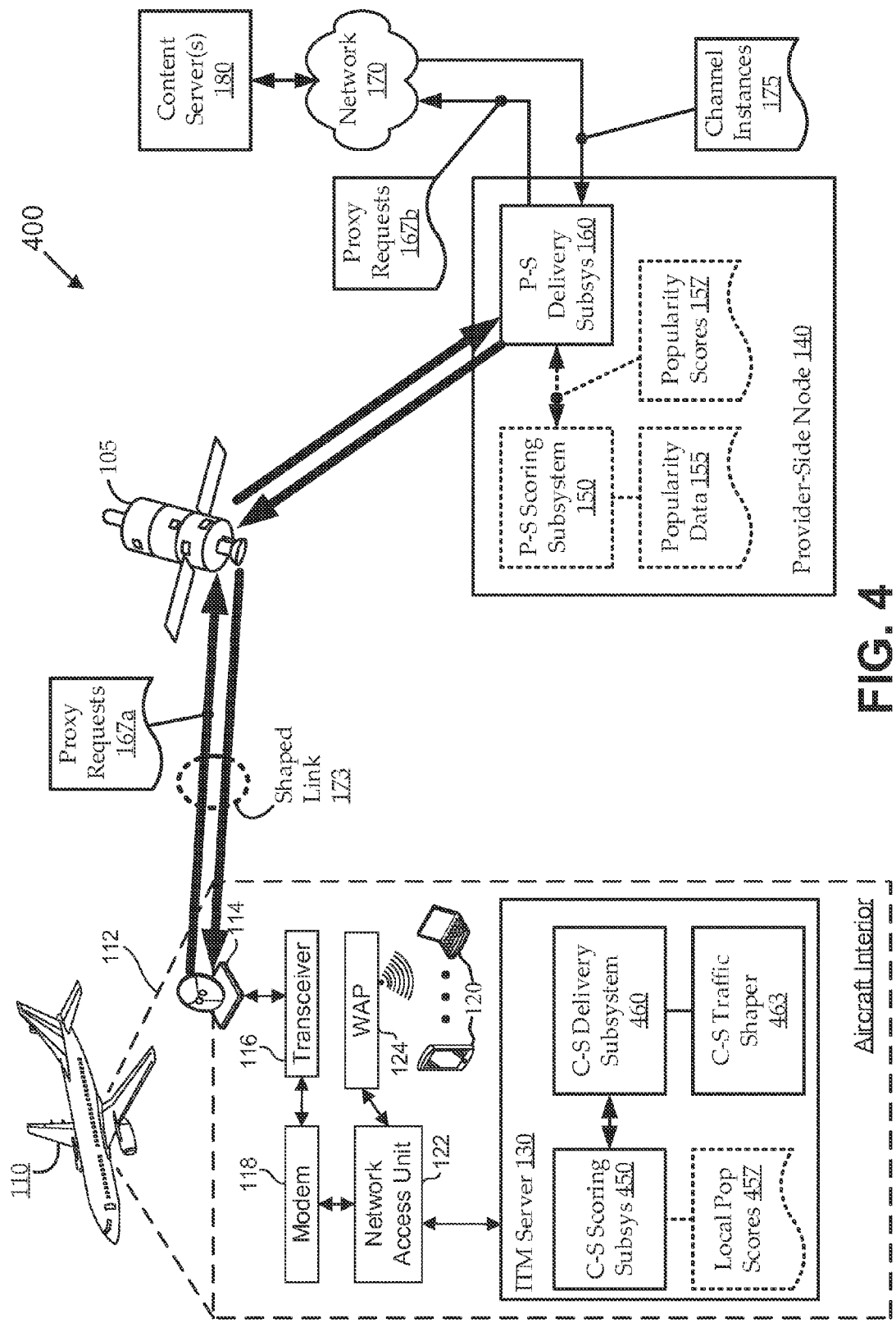
FIG. 4 shows a simplified diagram of another satellite communications system in which popularity-based bitrate adaptation is performed by craft-side traffic shaping, according to various embodiments.

FIG. 4 shows a simplified diagram of another satellite communications system 400 in which popularity-based bitrate adaptation is performed by craft-side traffic shaping, according to various embodiments. For the sake of clarity, FIG. 4 is illustrated as similar to FIGS. 1 and 3 using the same reference numerals, where appropriate. However, functionality described with reference to FIG. 4 can be implemented using alternative embodiments (e.g., other architectures, etc.). The satellite communications system 400 includes a transport craft 110 in communication with one or more content servers 180 via a satellite 105, a provider-side node 140, and a network 170. The transport craft 110 can include a two-way communication system 112 to facilitate bidirectional communication with the satellite 105, and the two-way communication system 112 can include an in-transport media server 130 to facilitate media distribution and/or other communications with client devices 120.

As shown, embodiments of the in-transport media server 130 can include a craft-side scoring subsystem 450 and a craft-side delivery subsystem 460, and the craft-side delivery subsystem 460 can include (or be in communication with) a craft-side traffic shaper 463. Some embodiments further include some or all of a provider-side scoring subsystem 150, a provider-side delivery subsystem 160, and a provider-side traffic shaper 163 (which can be implemented substantially as described with reference to FIGS. 1 and 3 above). Similarly to the traffic shaper 163 described in FIG. 3, embodiments of the craft-side traffic shaper 463 can implement any suitable traffic shaping techniques to form a shaped link over which to receive channel instances as channel DBIs 177. Alternatively, in some embodiments, the provider-side traffic shaper 163 can shape the communications link between the delivery subsystem 160 and the transport craft 110, which can similarly cause the transport craft 110 to request a particular one (or a subset of) the channel DBIs 177 based on the apparent data rate of the shaped link. In general, embodiments can exploit any suitable traffic shaping and/or other techniques for driving client-driven (e.g., craft-side) and/or server-driven (e.g., provider-side) bitrate adaptation.

In some embodiments, the provider-side scoring subsystem 150 can compute, maintain, and/or otherwise determine channel popularity scores 157 from provider-side channel popularity data 155 (e.g., aggregated over multiple transport craft, multiple carriers, etc.; and/or predicted based on various criteria, as described above). In other embodiments, the craft-side scoring subsystem 450 can compute, maintain, and/or otherwise determine local channel popularity scores 457 from local popularity data. For example, the local popularity data can relate to present aggregated requests from client devices 120 on the transport craft 110, from request trends maintained by the craft-side scoring subsystem 450, etc. In still other embodiments, the craft-side scoring subsystem 450 can determine local channel popularity scores 457 at least partly from provider-side channel popularity data 155. For example, the craft-side scoring subsystem 450 can query the provider-side scoring subsystem 150 (e.g., via the satellite 105) periodically, on-demand, or at any suitable time to obtain provider-side channel popularity data 155; which it can use to determine the local channel popularity scores 457 (e.g., with or without supplementing local popularity data).

The channel popularity scores (i.e., channel popularity scores 157 and/or channel popularity scores 457) can be used by the craft-side delivery subsystem 460 to determine bitrates at which to receive channel offerings. The determination of bitrate for the channel DBIs 177 by the delivery subsystem 160 can be implemented in any suitable manner (e.g., as described above with reference to FIG. 2A or 2B). The determined bitrates can be used by the craft-side traffic shaper 463 to determine how to for the traffic-shaped link 173. For example, the craft-side delivery subsystem 460 can communicate proxy requests 167a over shaped link 173 to the content server(s) 180 (e.g., via any or all of the satellite 105, the provider-side delivery subsystem 160, the network 170, etc.). In some implementations, the proxy requests 167a are either forwarded or reissued (e.g., in altered form) by the provider-side delivery subsystem 160 (as proxy requests 167b) to the content server(s) 180. According to some embodiments, the content server(s) 180 can automatically adapt the bitrate of the channel offering responses, so that the communicated channel instances 175 are received by the provider-side delivery subsystem 160 in response to the proxy requests 167b as the channel DBIs 177 (e.g., or can be altered therefrom to generate the channel DBIs 177 without changing the bitrates); and the channel DBIs 177 can be communicated in response to the proxy requests 167a of the craft-side delivery subsystem 460. According to other embodiments, one or more channel instances 175 are communicated from the content server(s) 180 to the provider-side delivery subsystem 160 in response to the proxy requests 167b; the provider-side delivery subsystem 160 can adapt the bitrates of some or all of the received channel instances 175 to generate the channel DBIs 177; and the channel DBIs 177 can be communicated in response to the proxy requests 167a of the craft-side delivery subsystem 460.

Figure 5:
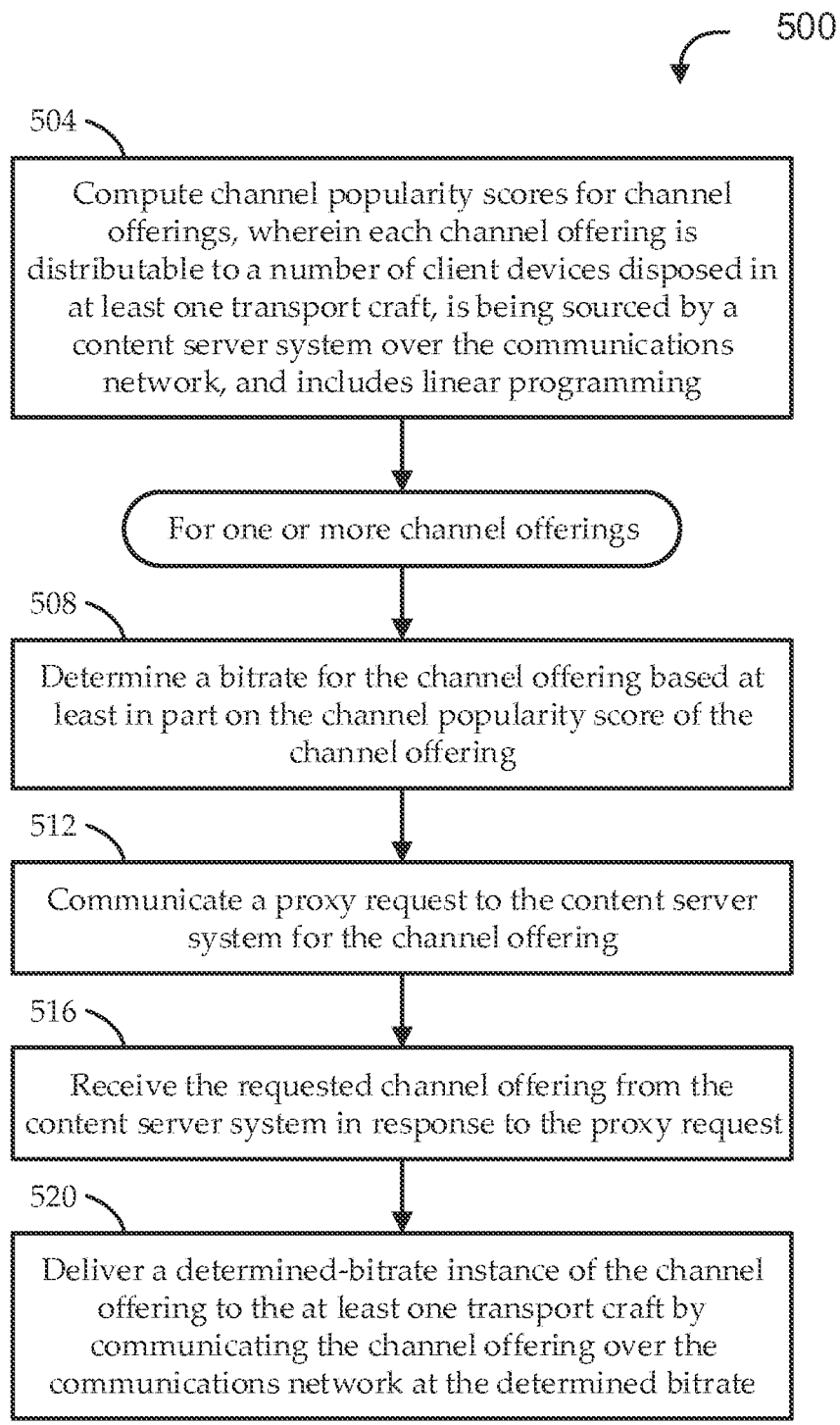
FIG. 5 shows a flow diagram of an illustrative method for popularity-aware bitrate adaptation, according to various embodiments.

FIG. 5 shows a flow diagram of an illustrative method 500 for popularity-aware bitrate adaptation, according to various embodiments. Embodiments of the method 500 can be implemented using any of the systems described with reference to FIGS. 1-4 above, and/or with any other suitable system. Embodiments begin at stage 504 by computing channel popularity scores for a number of channel offerings. Each channel offering is distributable to client devices disposed in at least one transport craft, each channel offering is being sourced by one or more content server systems over a communications network (e.g., a satellite network), and each channel offering includes linear programming. The computing can be performed in any suitable manner. In some implementations, the computing can be based at least in part on aggregated channel requests for the channel offering originating from the client devices (e.g., aggregated across the client devices of a single transport craft, aggregated across a carrier, aggregated across a subscriber grouping, etc.). In other implementations, the computing can be based at least in part on a predicted popularity of the channel offering with respect to the client devices.

The remaining stages of the method 500, stages 508-520, can be performed on each of one or more of the channel offerings (e.g., on any channel offering being requested by at least one client device, on all available channel offerings, etc.). At stage 508, embodiments can determine a bitrate for the channel offering based at least in part on the channel popularity score of the channel offering. At stage 512, a proxy request can be communicated to the content server system for the channel offering.

At stage 516, the requested channel offering can be received from the content server system in response to the proxy request communicated in stage 512. In some embodiments, the proxy request is communicated as an explicit request for a particular bitrate, and the channel offering is received from the content server system as a channel instance at the requested bitrate. In other embodiments, the proxy request is for one or more bitrates, or generally for the channel offering, and the channel offering is received as multiple instances at multiple bitrates. For example, one of the received bitrates can be the determined bitrate and/or one of the received bitrates can be converted to the determined bitrate. In certain implementations, the received bitrate(s) is converted to the determined bitrate only after a further determination that the determined bitrate is lower than the received bitrate(s).

At stage 520, embodiments can deliver a determined-bitrate instance of the channel offering to the at least one transport craft by communicating the channel offering over the communications network at the determined bitrate. In some embodiments, some or all stages of the method 500 (e.g., the delivery at stage 520) can be performed only when portions of the communications system are determined to be constrained. For example, implementations can determine whether a communications link of the communications network (e.g., any link of the network, the overall network, a link servicing a particular transport craft, etc.) is presently constrained. Bitrate adaptations and/or delivery of the channel DBIs can be performed in response to that determination.

As described above, the stages of the method 500 can be implemented with a number of variations. Some implementations can publish, to the client devices, availability of the channel offering at the determined bitrate. This can permit the client devices subsequently to request only the published determined-bitrate instance. In such implementations, the delivering at stage 520 can be in response to at least one subsequent request for the published determined-bitrate instance by at least one of the client devices. In other implementations, the communicating of the proxy request at stage 512 can be performed by a requesting system (e.g., at the provider side and/or at the craft side of the network) in communication with the content server system over a communications link of the communications network. In some such implementations, the requesting system can traffic shape the communications link in accordance with the determined bitrate and communicate the proxy request to the content server system for the channel offering over the traffic-shaped communications link. This can cause the content server system automatically to adapt to the traffic-shaped communications link by responding to the proxy request with the determined-bitrate instance.

Though some embodiments are described above with reference to a particular bitrate being determined for each channel offering, such descriptions assume the bitrate is being determined in context of a particular group of receivers. For example, a bitrate can be determined for communicating a particular channel offering at a particular time, to a particular transport craft, to a particular group of transport crafts, over a particular carrier, etc. However, multiple different bitrate determinations can be made for communicating the same channel offering, for example, over different carriers, at different times, etc. As one example, computing the channel popularity scores at stage 504 can include computing a first channel popularity score for a first transport craft having a first subset of the client devices disposed therein, and computing a second channel popularity score for a second transport craft having a second subset of the client devices disposed therein. At stage 508, the determining can then include determining a first bitrate for the channel offering according to the first channel popularity score and determining a second bitrate for the channel offering according to the second channel popularity score. At stage 520, a first instance of the channel offering can be delivered to the first transport craft by communicating the channel offering over the communications network at the first bitrate, and a second instance of the channel offering can be delivered to the second transport craft by communicating the channel offering over the communications network at the second bitrate. As another example, computing the channel popularity scores at stage 504 can include computing a first channel popularity score for a first carrier of the communications system servicing a first subset of the client devices, and computing a second channel popularity score for a second carrier of the communications system servicing a second subset of the client devices. At stage 508, the determining can then include determining a first bitrate for the channel offering according to the first channel popularity score and determining a second bitrate for the channel offering according to the second channel popularity score. At stage 520, a first instance of the channel offering can be delivered to the first subset of the client devices by communicating the channel offering over the first carrier at the first bitrate, and a second instance of the channel offering can be delivered to the second subset of the client devices by communicating the channel offering over the second carrier at the second bitrate.

The methods disclosed herein include one or more actions for achieving the described method. The method and/or actions can be interchanged with one another without departing from the scope of the claims. In other words, unless a specific order of actions is specified, the order and/or use of specific actions can be modified without departing from the scope of the claims.

The functions described can be implemented in hardware, software, firmware, or any combination thereof. If implemented in software, the functions can be stored as one or more instructions on a tangible computer-readable medium. A storage medium can be any available tangible medium that can be accessed by a computer. By way of example, and not limitation, such computer-readable media can include RAM, ROM, EEPROM, CD-ROM, or other optical disk storage, magnetic disk storage, or other magnetic storage devices, or any other tangible medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

A computer program product can perform certain operations presented herein. For example, such a computer program product can be a computer readable tangible medium having instructions tangibly stored (and/or encoded) thereon, the instructions being executable by one or more processors to perform the operations described herein. The computer program product can include packaging material. Software or instructions can also be transmitted over a transmission medium. For example, software can be transmitted from a website, server, or other remote source using a transmission medium such as a coaxial cable, fiber optic cable, twisted pair, digital subscriber line (DSL), or wireless technology such as infrared, radio, or microwave.

Further, modules and/or other appropriate means for performing the methods and techniques described herein can be downloaded and/or otherwise obtained by suitable terminals and/or coupled to servers, or the like, to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized. Features implementing functions can also be physically located at various positions, including being distributed such that portions of functions are implemented at different physical locations.

In describing the present invention, the following terminology will be used: The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" means quantities, dimensions, sizes, formulations, parameters, shapes and other characteristics need not be exact, but can be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations including, for example, tolerances, measurement error, measurement accuracy limitations and other factors known to those of skill in the art, can occur in amounts that do not preclude the effect the characteristic was intended to provide. Numerical data can be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3 and 4 and sub-ranges such as 1-3, 2-4 and 3-5, etc. This same principle applies to ranges reciting only one numerical value (e.g., "greater than about 1") and should apply regardless of the breadth of the range or the characteristics being described. A plurality of items can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items can be used alone or in combination with other listed items. The term "alternatively" refers to selection of one of two or more alternatives, and is not intended to limit the selection to only those listed alternatives or to only one of the listed alternatives at a time, unless the context clearly indicates otherwise. The term "coupled" as used herein does not require that the components be directly connected to each other. Instead, the term is intended to also include configurations with indirect connections where one or more other components can be included between coupled components. For example, such other components can include amplifiers, attenuators, isolators, directional couplers, redundancy switches, and the like. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples. As used herein, a "set" of elements is intended to mean "one or more" of those elements, except where the set is explicitly required to have more than one or explicitly permitted to be a null set.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein can be utilized. Accordingly, the appended claims include within their scope such processes, machines, manufacture, compositions of matter, means, methods, or actions.

What is claimed is:

1. A system for popularity-aware bitrate adaptation in content delivery over a constrained, multi-carrier communications network, the system comprising:
   a scoring subsystem that computes channel popularity scores for a plurality of channel offerings, wherein each channel offering of the plurality of channel offerings is distributable to a plurality of client devices disposed in a plurality of transport craft, is sourced by a content server system over the communications network, and comprises linear programming, the channel popularity scores being computed on a per-carrier basis, such that, upon a group of transport craft being concurrently serviced by a same carrier of the multi-carrier communications network, the channel popularity score of a channel offering of the plurality of channel offerings is computed in aggregate across the group of transport craft; and a delivery subsystem that, for the channel offering of the plurality of channel offerings:
  determines a bitrate for the channel offering based at least in part on the channel popularity score of the channel offering;
  communicates a proxy request to the content server system for the channel offering;
  receives the requested channel offering from the content server system in response to the proxy request; and
  delivers a determined-bitrate instance of the channel offering to the group of transport craft by communicating the channel offering over the communications network at the determined bitrate.

2. The system of claim 1, wherein:
the scoring subsystem computes the channel popularity score for the channel offering based at least in part on aggregated channel consumption of the channel offering by the client devices disposed in the group of transport craft.

3. The system of claim 1, wherein:
the scoring subsystem computes the channel popularity score for the channel offering based at least in part on a predicted popularity of the channel offering with respect to the client devices disposed in the group of transport craft.

4. The system of claim 1, wherein:
the delivery subsystem further determines whether a communications link of the communications network servicing a transport craft of the group of transport craft is presently constrained,
wherein the delivery subsystem delivers the determined-bitrate instance of the channel offering in response to determining that the communications link is presently constrained.

5. The system of claim 1, wherein the delivery subsystem further:
publishes, to the client devices disposed in the group of transport craft, availability of the channel offering at the determined bitrate, thereby permitting the client devices disposed in the group of transport craft subsequently to request only the published determined-bitrate instance,
wherein the delivery subsystem delivers the determined-bitrate instance in response to at least one subsequent request for the published determined-bitrate instance by at least one of the client devices disposed in the group of transport craft.

6. The system of claim 1, wherein:
the delivery subsystem receives a plurality of instances of the channel offering from the content server system in response to the proxy request; and
one of the received instances is the determined-bitrate instance.

7. The system of claim 1, wherein the delivery subsystem further:
converts a received bitrate of the received channel offering to generate the determined-bitrate instance.

8. The system of claim 7, wherein the delivery subsystem converts the received channel offering to generate the determined-bitrate instance only when the delivery subsystem determines that the determined bitrate is lower than the received bitrate.

9. The system of claim 1, wherein the proxy request comprises an explicit request for the determined-bitrate instance of the channel offering.

10. The system of claim 1, wherein:
the delivery subsystem further traffic shapes a communications link between the delivery subsystem and the content server system in accordance with the determined bitrate; and
the traffic-shaped communications link causes the content server system to adapt to the traffic-shaped communications link by responding to the proxy request with the determined-bitrate instance.

11. The system of claim 1, wherein:
the group of transport craft is a first group of transport craft;
the channel popularity scores is computed on a per-carrier basis, such that, upon the first group of transport craft being concurrently serviced by the same carrier, and a second group of transport craft being concurrently serviced by a second carrier of the multi-carrier communications network that is different from the same carrier,
the scoring system computes, for the channel offering, a first channel popularity score for the first group of transport craft and computes a second channel popularity score for the second group of transport craft; and
the delivery subsystem:
  determines a first bitrate for the channel offering according to the first channel popularity score, and determines a second bitrate for the channel offering according to the second channel popularity score; and
  delivers a first instance of the channel offering by communicating the channel offering over the communications network to client devices disposed in the first group of transport craft at the first bitrate, and delivers a second instance of the channel offering by communicating the channel offering over the communications network to client devices disposed in the first group of transport craft at the second bitrate.

12. The system of claim 11, wherein the scoring system further:
first aggregates channel requests from the client devices disposed in the first group of transport craft; and
second aggregates channel requests from the client devices disposed in the second group of transport craft,
wherein the first channel popularity score is computed according to the first aggregated channel requests, and the second channel popularity score is computed according to the second aggregated channel requests.

13. The provider-side system of claim 1, wherein the communications network comprises a satellite communications link between the at least one transport craft and the content server.

14. The system of claim 1, wherein:
the delivery subsystem is disposed in a provider-side node of the communications network.

15. The system of claim 1, wherein:
the delivery subsystem is disposed in the at least one transport craft.

16. A method for popularity-aware bitrate adaptation in content delivery over a bandwidth-constrained, multi-carrier carrier communications network to a plurality of client devices disposed in a plurality of transport craft, the method comprising:
- computing, upon a group of transport craft being concurrently serviced by a same carrier of the multi-carrier communications network, a channel popularity score for a channel offering of a plurality of channel offerings on a per-carrier basis by computing the channel popularity score of the channel offering is aggregate across the group of transport craft, wherein each channel offering is distributable to the plurality of client devices, is being sourced by a content server system over the communications network, and comprises linear programming;
- determining a bitrate for the channel offering based at least in part on the channel popularity score of the channel offering;
- communicating a proxy request to the content server system for the channel offering;
- receiving the requested channel offering from the content server system in response to the proxy request; and
- delivering a determined-bitrate instance of the channel offering to the group of transport craft by communicating the channel offering over the communications network at the determined bitrate.

17. The method of claim 16, wherein the computing is based at least in part on aggregated channel consumption of the channel by the client devices disposed in the group of transport craft.

18. The method of claim 16, wherein the computing is based at least in part on a predicted popularity of the channel offering with respect to the client devices disposed in the group of transport craft.

19. The method of claim 16, further comprising:
- determining whether a communications link of the communications network servicing the group of transport craft is presently constrained,
- wherein the delivering is in response to determining that the communications link is presently constrained.

20. The method of claim 16, further comprising:
- publishing, to the client devices disposed in the group of transport craft, availability of the channel offering at the determined bitrate, thereby permitting the client devices disposed in the group of transport craft subsequently to request only the published determined-bitrate instance,
- wherein the delivering is in response to at least one subsequent request for the published determined-bitrate instance by at least one of the client devices disposed in the group of transport craft.

21. The method of claim 16, further comprising:
- receiving a plurality of instances of the channel offering from the content server system in response to the proxy request, wherein one of the received instances is the determined-bitrate instance.

22. The method of claim 16, further comprising:
- converting a received bitrate of the received channel offering to generate the determined-bitrate instance.

23. The method of claim 22, wherein the converting is performed only when the determined bitrate is lower than the received bitrate.

24. The method of claim 16, wherein the proxy request comprises an explicit request for the determined-bitrate instance of the channel offering.

25. The method of claim 16, wherein:
- the communicating is performed by a delivery system in communication with the content server system over a communications link of the communications network;
- the communicating comprises traffic shaping the communications link in accordance with the determined bitrate; and
- the traffic-shaped communications link causes the content server system to adapt to the traffic-shaped communications link by responding to the proxy request with the determined-bitrate instance.

26. The method of claim 16, wherein:
- the same carrier is a first carrier of the multi-carrier communications system;
- the computing comprises computing, for the channel offering, a first channel popularity score for the first carrier, and computing a second channel popularity score for a second carrier of the multi-carrier communications system that that is different from the first carrier and is concurrently servicing a second group of transport craft different from the first group of transport craft;
- the determining comprises determining a first bitrate for the channel offering according to the first channel popularity score, and determining a second bitrate for the channel offering according to the second channel popularity score; and
- the delivering comprises delivering a first instance of the channel offering to the first group of transport craft by communicating the channel offering over the first carrier at the first bitrate, and delivering a second instance of the channel offering to the second group of transport craft by communicating the channel offering over the second carrier at the second bitrate.

* * * * *